United States Patent
Sugahara

(10) Patent No.: US 7,519,107 B2
(45) Date of Patent: Apr. 14, 2009

(54) CDMA RECEIVING APPARATUS, METHOD, PROGRAM AND RECORDING MEDIUM

(75) Inventor: Shiro Sugahara, Chiba (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 996 days.

(21) Appl. No.: 10/894,118

(22) Filed: Jul. 20, 2004

(65) Prior Publication Data

US 2005/0047488 A1 Mar. 3, 2005

(30) Foreign Application Priority Data

Aug. 25, 2003 (JP) .............................. 2003-299482

(51) Int. Cl.
*H04B 1/00* (2006.01)
(52) U.S. Cl. ....................... 375/150; 375/148; 370/335; 370/342
(58) Field of Classification Search ................. 375/148, 375/147, 130, 144, 150; 370/335, 342
See application file for complete search history.

(56) References Cited

U.S. PATENT DOCUMENTS

| | | | | |
|---|---|---|---|---|
| 6,768,729 B1 * | 7/2004 | Ohsuge | ....................... | 370/342 |
| 7,042,862 B1 * | 5/2006 | Hirade | ....................... | 370/335 |
| 7,254,162 B2 * | 8/2007 | Terao | ....................... | 375/150 |
| 2004/0013169 A1 * | 1/2004 | Kanemoto et al. | .......... | 375/147 |

FOREIGN PATENT DOCUMENTS

| | | |
|---|---|---|
| EP | 0808031 A2 | 11/1997 |
| EP | 0945995 A2 | 9/1999 |
| EP | 1049264 A2 | 11/2000 |
| EP | 1143631 A2 | 10/2001 |
| EP | 1363406 A1 | 11/2003 |
| JP | 2000-312164 A | 11/2000 |
| JP | 2001-292076 A | 10/2001 |
| WO | WO-99/57819 | 11/1999 |

* cited by examiner

*Primary Examiner*—Temesghen Ghebretinsae
(74) *Attorney, Agent, or Firm*—Birch, Stewart, Kolasch & Birch, LLP

(57) ABSTRACT

In a CDMA receiving apparatus, a delay profile using a desired constraint length is generated by a delay profile generating unit from received signal wave-form data recorded on a received signal wave-form buffer unit. Several demodulation paths are selected at peak position of the delay profile by the path search unit. Demodulation symbols which are generated from received signal wave-form data of each demodulation path by the channel demodulating unit are brought into in-phase by an adjustment angle which is obtained by the channel estimating unit. If the reception quality which is measured by the reception quality measuring unit is lower than a predetermined value for a combined demodulation symbol which is combined by a RAKE unit, the combination of said selected demodulation paths or the constraint length is changed to repeat the demodulation operation of the same received signal wave-form data.

26 Claims, 3 Drawing Sheets

# CDMA RECEIVING APPARATUS, METHOD, PROGRAM AND RECORDING MEDIUM

BACKGROUND OF INVENTION

This Non-provisional application claims priority under 35 U.S.C. § 119(a) on Patent Application No(s). 2003-299482 filed in Japan on Aug. 25, 2003, the entire contents of which are hereby incorporated by reference.

The present invention relates to a CDMA receiving apparatus, CDMA receiving method, CDMA receiving program and program recording medium and in particular to a mobile CDMA receiving apparatus, CDMA receiving method, CDMA receiving program and a program recording medium in a cellular system using a CDMA scheme.

If a CDMA (code division multiple access) scheme is used for a mobile communication such as cellular phone, the same frequency band can be used on a plurality of channels at the same time. On the transmitter side, a signal to be transmitted is multiplied by a diffusion code which is different for each channel and is then transmitted as so-called diffused signal. Since a code series, the rate of which is tens or hundreds times as high as that of transmission symbol data as the diffusion code, symbol data is diffused in a wider frequency band and transmission is conducted. On the other hand, on the side of CDMA receiving apparatus, transmitted diffused signal is received and is multiplied by a diffusion code (dediffusion code) assigned to the receiving apparatus in synchronization with the receiving timing for conducting a dediffusion for integration over one symbol. Thus, a correlation value is obtained. A large correlation value can be obtained on the receiving apparatus side only if the dediffusion code is the same as the diffusion code on the transmission side. The correlation value of the symbol which is the same as the symbol data which has been transmitted on the transmission side can be obtained as a demodulated symbol.

For demodulation of the received signal, it is necessary to align the timing of the diffusion code by which the diffused signal is multiplied is required to with that of the diffusion code (dediffusion code) which multiplies the received signal on the receiving apparatus side. If the timing is shifted by only one-chip which forms a minimum unit of the diffusion code, the dediffused signal may become a signal which has been multiplied by totally different diffusion code (dediffused code), so that a high correlation value can not be obtained.

Even if multiple paths exist due to reflection and refraction of the electromagnetic waves by buildings or mountains in CDMA scheme, demodulated signal on any one of paths of interest can be properly obtained without being influenced by the other paths if the timing of the diffused signal (dediffused signal) is matched with that of the path.

The distribution of the signal power with respect of the signal power with respect to delay time of each path can be obtained by detecting the signal timing of each path and by plotting the wave shape of the received signal of each timing. Delay profile which represents the timing of each path can be obtained. In other words, received signal of each path is represented as respective independent pulse-shaped wave form of the received signal on the delay profile and is substantially similar to the impulse response characteristics of radio signal propagation path. Therefore, a plurality of, for example, N generators of diffusion code (dediffusing code) and a plurality of, for example, N correlators which determine the correlation between the diffusion code and dediffusion code are provided. The timing of the diffusion code (dediffusion code) is matched with the timings of N paths which are extracted in order of the highest peak value of the wave-forms of received signals from the delay profile. Correlation with the received signals along respective paths is determined by respective correlators for demodulating the received signals. High quality of received signals can be obtained by adding the demodulated signals by using a RAKE combiner which brings the demodulated signals in phase and multiplies them by a proper coefficient.

A technique which detects the positions of timings of the multipath and brings the received signal of each path in phase is disclosed in Japanese Laid-Open Patent Publication No. 2000-312164 titled "spectrum diffusion receiving apparatus," hereinbelow "Patent reference 1". The receiving apparatus which is disclosed in Patent reference 1 selects each timing position by a path search which is preliminarily conducted. The received signals of plural paths in each timing position are independently demodulated and are output as demodulated symbols. Timing adjustment is conducted so that the demodulated symbols of respective paths are in phase. A technique for outputting a demodulated and combined symbol adopted.

As is disclosed in Japanese Laid-Open Patent Publication No. 2001-292076 entitled "Multipath detecting circuit," hereinbelow "Patent reference 2," when a delay profile for setting the timing position of each path is determined for absorbing path level variations due to phasing, the delay profile is generated by averaging the levels of signals which were received in the past over a predetermined period of time (for example, 100 m seconds). A path search is conducted based upon the generated delay profile. A demodulated and combined signal is output by RAK combining the demodulated signals of multipath.

The peak power value of the received signal is fluctuated due to the influence of phasing as shown by double headed arrows of solid line in FIG. 3 where the delay profile is generated as shown in FIG. 3. The power components of noise which is mixed with the received signal and the power component of the received signal are fluctuated. Thus, the signal to noise ratio may fall below a threshold level, the signal may not be detected as peak power value which is representative of the path of the received signal. FIG. 3 is a schematic view showing the generation of the delay profile of detecting the path based upon the power level of the received signal. In FIG. 3, paths A, B and C are detected in three timing positions of peak power values a, b and c of the received signal of the delay profile. In order to prevent the peak power value from being unable to recognize as signal path due to the fact that the peak power values a, b and c of the received signal fall below the threshold level or to prevent erroneous detection of the peak power value as signal path due to the fact that the noise level exceeds the threshold level, the levels of the signal including the signals which have been received in past are averaged over a period of time.

The above-mentioned prior art receiving apparatus of the CDMA scheme has a problem which will be described hereafter. The prior art receiving apparatus which determines the timing which represents the peak power value by consecutively averaging the signal levels is not capable of following abrupt change in signal level if the receiving environment abruptly changes so that channel estimating result changes. Specifically, the delay profile used for path search (that is, signal power distribution relative to the delay time of each path), the demodulation symbol of a pilot channel used for channel estimation and cell detection result used for cell selection will be influenced by the result of past measurements since averaging processing of the past measurements is conducted. There is a strong likelihood that demodulation which is adapted to the abruptly changed receiving environment and determination for cell selection can not be conducted. Therefore, if above-mentioned abrupt change in receiving environment occurs, the error rate of the demodulation symbol (received signal) will deteriorate, so that the performance of the receiving apparatus will be lowered.

If the condition of the electromagnetic waves which are being received deteriorates for a prior art receiving apparatus which conducts a demodulation operation independently of the receiving condition, the signal power as well as the noise power would be included in the delay profile used for path search. When the peak of the receiving power (correlation peak) used for determining the signal power is detected, the peak of noise power which is momentarily generated may also be picked up. In a receiving environment in which the electromagnetic waves are thus deteriorating, the peak of the noise power is erroneously included in a modulation path for determining demodulated symbols. The error rate of the demodulated symbol would be deteriorated.

If the condition of the electromagnetic waves which are being received deteriorates for the prior art receiving apparatus which conducts a demodulation operation independently of the receiving condition, it would be difficult to discriminate between the signal power and noise power peaks. Therefore, if a determination is made so that the signal power peak which is not higher than a given threshold is not used for determining a demodulation path which uniquely representing a signal, the path for demodulation for which even low signal power peak is used would be deleted. The error rate of the demodulated symbol is also deteriorated by the amount of the deleted signals.

In a prior art receiving apparatus which conducts a demodulation operation independently of the receiving condition, the length of the constraint when the correlation is calculated for generating the delay profile used for path search is fixed to only a predetermined specific length. Accordingly, if the condition of the radio-waves which are being received deteriorates, the signal power peak can not be discriminated from the noise power peak. Demodulation might be conducted based upon erroneous path. In other words, use of erroneous peak (noise power peak) which is not the single power peak is used for the demodulation symbol. In a prior art receiving apparatus which conducts a demodulation operation independently of the receiving condition, the length of the constraint when the correlation is calculated for generating the delay profile used for path search is fixed to only a predetermined specific length. Accordingly, the length of constraint may be fixed to an excessively long length so that the delay profile can be obtained which is more detailed than the delay profile having information enough to select accurate path. There is a possibility that delay profile which is more detail than required is calculated. Therefore, this may result in that the processing burden becomes heavier and much power is consumed due to the fact that the length of constraint is longer than required.

Furthermore, it is necessary to conduct on a real-time basis a receiving operation which relies upon the wave-form of the received signal like CDMA scheme. Even if data on the wave-forms of the received signal is recorded on a different recording area on each of unit processing lengths, that is processing unit times, recording of the data on the wave-forms of successively and parallely received signals is needed if the data on the wave-forms of the received signals which is recorded on different recording area for each unit processing time is continuously kept for processing which takes an extended period of time. Ultimately, enormous recording area would be necessary.

If reception of stand-by information on a stand-by channel is conducted in a prior art receiving apparatus of CDMA scheme, the power to each of circuits including a radio-unit is turned on in synchronization with the timing of receiving of the stand-by information assigned to receiving apparatus (station) and thereafter a path search is for demodulation relating to stand-by information which was received by the radio unit and then power is turned on until desired stand-by information is demodulated from the detected path information. As a result, the period of time for which the power to each of circuits including the radio unit is turned on is a sum of a period of time for which the stand-by information is received, a period of time taken to path search and a period of time taken to demodulate the stand-by information. This invites an increase in power consumption.

If an operation to receive stand-by information on the stand-by channel is performed, it is necessary to obtain information for detecting channels of peripheral cells depending upon the result of demodulation of the stand-by information, in addition to the reception and demodulation of the stand-by information. In order to shorten the receiving period of time for reducing the power consumption, it is necessary to perform a channel demodulation operation and channel detection operation in a parallel manner. On the other hand, in case of a receiving apparatus in which no recording means (recording buffer) which is capable of consecutively holding data on the wave-forms of received signal on a real-time basis is incorporated therein like a prior art receiving apparatus of CDMA scheme, the receiving apparatus should be configured to include parallel processing systems which simultaneously conduct the channel demodulation operation and channel detection operation. In other words, it is necessary to include two or more processing systems, each comprising a delay profile generating unit (that is, the distribution of the power of signal relative to the delay time of each path) for generating respectively delay profiles from the received signals, a path search unit for detecting a demodulation path based upon the delay profile and a channel demodulating unit for demodulating received signals relating to detected demodulation path and the like. This invites an increase in cost of the receiving apparatus.

If an operation to receive stand-by information on a stand-by channel is performed in a prior art receiving apparatus in which a demodulation operation is performed independently of the receiving condition of the stand-by information, the length of the constraint for determining the delay profile is fixed to only a predetermined specified length as is done in the case of the above-mentioned received signal if an operation to receive stand-by information on a stand-by channel is performed. Therefore, if the receiving condition deteriorates, the possibility to detect the signal power peak related with the stand-by information as well as the power peak caused by noise as demodulation path becomes higher, so that selection of an erroneous path is inevitable on reception of the stand-by path. The error rate of the demodulation result relating to the stand-by information will deteriorate.

In a prior art receiving apparatus which conducts a demodulation operation independently of the receiving condition, the length of the constraint when the delay profile is determined is fixed to only a predetermined specific length if a receiving operation of stand-by information on a stand-by channel is performed. Accordingly, the length of constraint may be fixed to an excessively long length so that the delay profile can be obtained which is more detailed than the delay profile having enough information to select an accurate path. There is a possibility that a delay profile that is more detailed than required is calculated. Therefore, this results in heavier processing burden and greater power consumption due to the fact that the length of constraint is longer than required.

In the prior art receiving apparatus of CDMA scheme, processing units such as delay profile generating unit for generating delay profiles, a path search unit for detecting demodulating paths based upon the delay profiles and a channel demodulating unit for demodulating information on the detected demodulating paths are often all formed of hardware. In particular, the channel demodulating unit which demodulates received signals on multipath on a real-tie basis should include a number of pieces of hardware which is equal to the number of paths. Accordingly, the circuit scale becomes larger and the cost of the receiving, apparatus increases.

SUMMARY OF THE INVENTION

It is an object of the present invention to improve the reception error characteristics. The object of the present invention is accomplished as follows: There is provided a received signal wave-form buffer unit which is capable of recording received signal wave-form data in which the amplitude of the received signal wave-form is digitalized on different recording areas for each unit processing length. A delay profile which represents the signal power distribution relative to the delay time on a path is generated by multiplying said received signal wave-form data by a demodulation code and determining a sum for a time interval which is given as a desired constraint length. The timing position at which the signal power peaks is determined as a path candidate used for signal demodulation based upon the generated delay profile. A plurality of demodulation paths which is as many as the number of predetermined demodulation paths are selected from said path candidates. After each demodulation symbol of demodulation path is demodulated by using the same received signal wave-form data recorded on the received signal wave-form buffer unit, the symbol phases of the demodulation symbol of each demodulation path are aligned so that the symbols are RAKE combined to provide a combined demodulation symbol. The combination of said demodulation paths is charged depending upon the error rate of the combined demodulation symbols. A demodulation operation for outputting the combined demodulation symbol for the same received signal wave-form data is repeated to improve the reception error characteristics.

There is provided a wake-up counter for counting the wake-up timings which is substantially synchronized with the stand-by information reception timing when the stand-by information is received. With the wake-up timing, the power to the radio unit and received signal wave-form buffer unit is turned on to record the received signal wave-form data on the stand-by information for a period of time required for channel detection of stand-by information and/or peripheral cells. After completion of recording, the power to the radio unit is turned off and then a channel demodulation related with stand-by information is conducted and the power to each circuit unit for channel detection related with peripheral cells is turned on. The power to each circuit unit other than the wake-up counter is turned off when the channel demodulation and/or channel detection operation is completed, so that reduction in power consumption is achieved.

The present invention also provides a CDMA receiving apparatus which receives radio-signal of CDMA scheme to perform channel detection and channel demodulation operations, wherein said apparatus comprises a received signal wave-form buffer unit which digitalizes the amplitude of the wave-form of the signal which is received by a radio unit for recording the signal as data on the received signal wave-form; a delay profile generating unit for generating a delay profile which represent the distribution of the signal power value relative to the delay time on a path by calculating as a signal power value a sum of the correlation values which are obtained by multiplying said received signal wave-form data by a desired channel code over a time interval which is provided as a predetermined desired length of constraint if the time length of said received signal wave-form data recorded on said received signal wave-form buffer unit becomes a predetermined processing unit length; a path search unit for obtaining the time of respective demodulation paths by detecting the time at which the signal power value of said delay profile peak to detect the path candidates used for demodulating said received signal and to select the demodulation paths which are to be applied for demodulation, having a number not more than predetermined maximum number of paths; a channel estimating unit for demodulating the pilot symbols of respective demodulation paths by determining the correlation between said received signal wave-form data recorded on the received signal wave-form buffer unit and demodulation code assigned to said CDMA receiving apparatus on a symbol unit basis at said time of said respective demodulation paths which are selected by said path search unit and for estimating an adjustment angle for aligning phases of said respective demodulation paths from a result of demodulation, of said pilot symbol; a channel demodulating unit which determines correlations between said received signal wave-form data recorded on said receiving signal wave-form buffer unit and said demodulation code at said time of said respective selected demodulation paths, as demodulation symbols, on a symbol unit basis and for adjusting the phases of the symbols which are determined for each demodulation path based upon said adjustment angle of said each demodulation path which is estimated by said channel estimating unit; a RAKE unit which combines said demodulation symbols of said respective demodulation paths, the phases of which are aligned to obtain combined demodulation symbols for outputting them; and a reception quality measuring unit for measuring the reception quality by comparing said combined demodulation symbol related with said pilot symbol of said combined demodulation symbols with a predetermined pilot pattern, and in that said demodulation paths which are selected in said path search unit are changed depending upon whether or not said reception quality measured by said reception quality measuring unit is lower than a predetermined preset reference value.

Another object of the present invention is to provide a CDMA receiving apparatus, wherein if said reception quality which is measured by said reception quality measuring unit is lower than said preset reference value, a different combination of paths having a number not more than predetermined maximum number of paths is reselected by said path search unit as said demodulation paths to be applied to demodulation and in that said steps of estimating said adjustment angle of each path by said channel estimating unit, channel modulating by said channel demodulating unit, combining of said demodulation symbols by said RAKE unit and measuring of said reception quality by said reception quality measuring unit are repeated again by using said same received signal wave-form data recorded on said received signal wave-form buffer unit.

The present invention further provides a CDMA receiving apparatus, wherein if said reception quality measured by said reception quality measuring unit is lower than said preset reference value, a different combination of a predetermined number of paths is reselected as said demodulation paths to be applied to demodulation from said path candidates and in that said steps of estimating said adjustment angle of each path by said channel estimating unit, channel modulating by said channel demodulating unit, combining of said demodulation symbols by said RAKE unit and measuring of said reception quality by said reception quality measuring unit are repeated again by using said same received signal wave-form data recorded on said received signal wave-form buffer unit, and if said reception. quality measured by said reception quality measuring unit is lower than said preset reference value for all combinations of said repeated demodulation paths to be applied to demodulation by said path search unit, a combination of said demodulation paths having best reception quality is selected from combinations of said demodulation paths having a reception quality which is not lower than a second reference value which is preset lower than said preset reference value so that said combined modulation symbol which is combined by said RAKE unit is output.

The present invention further provides a CDMA receiving apparatus, wherein if said reception quality measured by said reception quality measuring unit is lower than said preset reference value or is lower than a second reference value which is preset as .a value lower than said preset reference value, said constraint length in said delay profile is set longer by a predetermined length, and said steps of estimating said adjustment angle of each path by said channel estimating unit, channel modulating by said channel demodulating unit, combining of said demodulation symbols by said RAKE unit and measuring of said reception quality by said reception quality measuring unit are repeated again by using said same received signal wave-form data recorded on said received signal wave-form buffer unit.

The present invention further provides a CDMA receiving apparatus, wherein if said reception quality is not lower than said preset reference value, said constraint length in said delay profile which is applied to subsequent received signals is set shorter by a predetermined value.

The present invention further provides a CDMA receiving apparatus, wherein said received signal wave-form buffer unit comprises a plurality of recording areas which are different for each of said processing unit lengths, for recording said received signal wave-form data and in that said received signal wave-form data on the signals which are received by said radio unit until output processing of said combined demodulation symbols by said RAKE unit using said received signal wave-form data recorded on any of said recording areas is completed is recorded on a recording area which is different from said recording area and in that when said output processing of said combined demodulation symbols using said received signal wave-form data recorded on said different recording area is completed, said different recording area is immediately cleared for recording.

The present invention further provides a CDMA receiving apparatus, wherein said CDMA receiving apparatus further includes a wake-up counter which counts a predetermined wake-up timing which is substantially synchronized with the transmission timing of stand-by information transmitted from a broadcasting station on a stand-by channel, in that when said wake-up counter counts out said wake-up timing, the power to said radio unit and said received signal wave-form buffer unit is turned on for receiving and recording said standby information on said stand-by channel and the power to said radio unit is turned on at the timing when a period of time elapses which is long enough to receive said stand-by information by said radio unit and to record said received signal wave-form data of said received stand-by information on said received signal wave-form buffer unit.

The present invention further provides a CDMA receiving apparatus, wherein the power to said delay profile generating unit, said path search unit, said channel estimating unit, said channel demodulating unit, said RAKE unit and said reception quality measuring unit is turned on at a time to conduct a demodulation operation related with said received stand-by information when a period of time enough to record on said received signal wave-form buffer unit elapses and the power to said all units other than said wake-up counter unit is turned off at a time when the demodulation operation related with said stand-by information is completed.

The present invention further provides a CDMA receiving apparatus, wherein the power to all units other than said wake-up counter is turned off when said channel detection operation to peripheral cells is completed in lieu of the time when the demodulation operation related with said stand-by information is completed if the channel detecting operation related with the peripheral cells is required in association with the demodulation operation related with said stand-by information.

The present invention further provides a CDMA receiving apparatus, wherein the power to said radio unit is turned off at a time when the period of time to record said received signal wave-form data related with said stand-by information on said received signal wave-form buffer unit plus the period of time to record on said received signal wave-form buffer unit, the received signal wave-form data required for channel detection related with peripheral cells which may be executed in association with said stand-by information elapses.

The present invention further provides a CDMA receiving apparatus, wherein if said reception quality related with said stand-by information measured by said reception quality measuring unit is lower than said preset reference value or is lower than a second reference value which is preset as a value lower than said preset reference value, said constraint length in said delay profile is set longer by a predetermined length, and in that said steps of estimating said adjustment angle of each path by said channel estimating unit, channel modulating by said channel demodulating unit, combining of said demodulation symbols by said RAKE unit and measuring of said reception quality by said reception quality measuring unit are repeated again by using said same received signal wave-form data related with said stand-by information recorded on said received signal wave-form buffer unit.

The present invention further provides a CDMA receiving apparatus, wherein if said reception quality related with said stand-by information is not lower than said preset reference value, said constraint length in said delay profile which is applied to subsequent stand-by information is set shorter by a predetermined value.

The present invention further provides a CDMA receiving apparatus, wherein hardware logics of any one or more of said delay profile generating unit, said path search unit, said channel estimating unit, said channel demodulating unit, said RAKE unit and said reception quality measuring unit are implemented by a program, which is executed by an operation and processing device included in said CDMA receiving apparatus.

The present invention further provides a CDMA receiving method which receives radio-signal of CDMA scheme to perform channel detection and channel demodulation operations, wherein there is provided a received signal wave-form buffer unit which digitalizes the amplitude of the wave-form of the signal which is received by a radio unit for recording the signal as data on the received signal wave-form, in that said method comprises a delay profile generating step for generating a delay profile which represent the distribution of the signal power value relative to the delay time on a path by calculating as a signal power value a sum of the correlation values which are obtained by multiplying said received signal wave-form data by a desired channel code over a time interval which is provided as a predetermined desired length of constraint if the time length of said received signal wave-form data recorded on said received signal wave-form buffer unit becomes a predetermined processing unit length; a path search step for obtaining the time of respective demodulation paths by detecting the time at which the signal power value of said delay profile peak to detect the path candidates used for demodulating said received signal and to select the demodulation paths which are to be applied for demodulation, having a number not more than predetermined maximum number of paths; a channel estimating step for demodulating the pilot symbols of respective demodulation paths by determining the correlation between said received signal wave-form data recorded on the received signal wave-form buffer unit and demodulation code assigned to a CDMA receiving apparatus on a symbol unit basis at said time of said respective demodulation paths which are selected by said path search step and for estimating an adjustment angle for aligning phases of said respective demodulation paths from a result of demodulation of said pilot symbol; a channel demodulating step which determines correlations between said received signal wave-form data recorded on said receiving signal wave-form buffer unit and said demodulation code at said time of said respective selected demodulation paths, as demodulation symbols on a symbol unit basis and for adjusting the phases of the symbols which are determined for each demodulation path based upon said adjustment angle of said each demodulation path which is estimated by said channel estimating step; a RAKE step which combines said demodulation symbols of said respective demodulation paths, the phases of which are aligned to obtain combined demodulation symbols for outputting them; and a reception quality measuring step for measuring the reception quality by comparing said combined demodulation symbol related with said pilot symbol of said combined demodulation symbols with a predetermined pilot pattern, and in that said demodulation paths which are selected in said path search step are changed depending upon whether or not said reception quality measured by said reception quality measuring step is lower than a predetermined preset reference value.

The present invention further provides a CDMA receiving method, wherein if said reception quality which is measured by said reception quality measuring step is lower than said preset reference value, a different combination of paths having a number not more than predetermined maximum number of paths is reselected by said path search step as said demodulation paths to be applied to demodulation and in that said steps of estimating said adjustment angle of each path by said channel estimating step, channel modulating by said channel demodulating step, combining of said demodulation symbols by said RAKE step and measuring of said reception quality by said reception quality measuring step are repeated again by using said same received signal wave-form data recorded on said received signal wave-form buffer unit.

The present invention further provides a CDMA receiving method, wherein if said reception quality measured by said reception quality measuring step is lower than said preset reference value for all combinations of said repeated demodulation paths to be applied to demodulation by said path search step, a combination of said demodulation paths having best reception quality is selected from combinations of said demodulation paths having a reception quality which is not lower than a second reference value which is preset lower than said preset reference value so that said combined modulation symbol which is combined by said RAKE step is output.

The present invention further provides a CDMA receiving method, wherein if said reception quality measured by said reception quality measuring step is lower than said preset reference value or is lower than a second reference value which is preset as a value lower than said preset reference value, said constraint length in said delay profile is set longer by a predetermined length, and in that said steps of estimating said adjustment angle of each path by said channel estimating step, channel modulating by said channel demodulating step, combining of said demodulation symbols by said RAKE step and measuring of said reception quality by said reception quality measuring step are repeated again by using said same received signal wave-form data recorded on said received signal wave-form buffer unit.

The present invention further provides a CDMA receiving method, wherein if said reception quality measured by said reception quality measuring step is not lower than said preset reference value, said constraint length in said delay profile which is applied to subsequent received signals is set shorter by a predetermined value.

The present invention further provides a CDMA receiving method, wherein said received signal wave-form buffer unit comprises a plurality of recording areas which are different for each of said processing unit lengths, for recording said received signal wave-form data and in that said received signal wave-form data on the signals which are received by said radio unit until output processing of said combined demodulation symbols by said RAKE step using said received signal wave-form data recorded on any of said recording areas is completed is recorded on a recording area which is different from said recording area and in that when said output processing of said combined demodulation symbols using said received signal wave-form data recorded on said different recording area is completed, said different recording area is immediately cleared for recording.

The present invention further provides a CDMA receiving method, wherein said receiving apparatus further includes a wake-up counter unit which counts a predetermined wake-up timing which is substantially synchronized with the transmission time of stand-by information transmitted from a broadcasting station on a stand-by channel, in that when said wake-up counter counts out said wake-up timing, the power to said radio unit and said received signal wave-form buffer unit is turned on for receiving .and recording said stand-by information on said stand-by channel and the power to said radio unit is turned on at the timing when a period of time elapses which .is long enough to receive said stand-by information by said radio unit and to record said received signal wave-form data of said received stand-by information on said received signal way-form buffer unit.

The present invention further provides a CDMA receiving method, wherein the power to units for implementing said delay profile generating step, said path search step, said channel estimating step, said channel demodulating step, said RAKE step and said reception quality measuring step is turned on at a time to conduct a demodulation operation related with said received stand-by information when a period of time enough to record on said received signal wave-form buffer unit elapses and the power to said all units other than said wake-up counter unit is turned off at a time when the demodulation operation related with said stand-by information is completed.

The present invention further provides a CDMA receiving method, wherein the power to all units other than said wake-up counter unit is turned off when said channel detection operation to peripheral cells is completed in lieu of the time when the demodulation operation related with said stand-by information is completed if the channel detecting operation related with the peripheral cells is required in association with the demodulation operation related with said stand-by information.

The present invention further provides a CDMA receiving method, wherein the power to said radio unit is turned off at a time when the period of time enough to record said received signal wave-form data related with said stand-by information on said received signal wave-form buffer unit plus the period of time to record on said received signal wave-form buffer unit, the received signal wave-form data required for channel detection related with peripheral cells which maybe executed in association with said stand-by information elapses.

The present invention further provides a CDMA receiving method, wherein if said reception quality related with said stand-by information measured by said reception quality measuring step is lower than said preset reference value or is lower than a second reference value which is preset as a value lower than said preset reference value, said constraint length in said delay profile is set longer by a predetermined length, and in that said steps of estimating said adjustment angle of each path by said channel estimating step, channel modulating by said channel demodulating step, combining of said demodulation symbols by said RAKE step and measuring of said reception quality by said reception quality measuring step are repeated again by using said same received signal wave-form data related with said stand-by information recorded on said received signal wave-form buffer unit.

The present invention further provides a CDMA receiving method, wherein if said reception quality related with said stand-by information is not lower than said preset reference value, said constraint length in said delay profile which is applied to subsequent stand-by information is set shorter by a predetermined value.

The present invention further provides a program which is executed by a computer, which implements a CDMA receiving method, wherein any one or more of said delay profile generating step, said path search step, said channel estimating step, said channel demodulating step, said RAKE step and said reception quality measuring step.

The present invention further provides a program recording medium on which said CDMA receiving program as defined in the above technical means is recorded and which is readable by a computer.

PREFERRED EMBODIMENT OF THE INVENTION

The CDMA receiving apparatus, CDMA receiving method, CDMA receiving program and program recording medium of the present invention comprises a received signal wave-form buffer unit which is capable of recording received signal wave-form data in which the amplitude of the received signal wave-form is digitalized on different recording areas for each unit processing length. A delay profile which represents the signal power distribution relative to the delay time on a path is generated by multiplying said received signal wave-form data by a demodulation code and determining a sum for a time interval which is given as a desired constraint length. The timing position at which the signal power peaks is determined as a path candidate used for signal demodulation based upon the generated delay profile. A plurality of demodulation paths which is as many as the number of predetermined demodulation paths are selected from said path candidates. After each demodulation symbol of demodulation path is demodulated by using the same received signal wave-form data recorded on the received signal wave-form buffer unit, the symbol phases of the demodulation symbol of each demodulation path are aligned so that the symbols are RAKE combined to provide a combined demodulation symbol. The combination of said demodulation paths is charged depending upon the error rate of the combined demodulation symbols. A demodulation operation for outputting the combined demodulation symbol for the same received signal wave-form data is repeated to improve the reception error characteristics.

The CDMA receiving apparatus, CDMA receiving method, CDMA receiving program, and program recording medium of the present invention comprises a wake-up counter for counting the wake-up timings which is substantially synchronized with the stand-by information reception timing when the stand-by information is received. With the wake-up timing, the power to the radio unit and received signal wave-form buffer unit is turned on to record the received signal wave-form data on the stand-by information for a period of time required for channel detection of stand-by information and/or peripheral cells. After completion of recording, the power to the radio unit is turned off and then a channel demodulation related with stand-by information is conducted and the power to each circuit unit for channel detection related with peripheral cells is turned on. The power to each circuit unit other than the wake-up counter is turned off when the channel demodulation and/or channel detection operation is completed, so that reduction in power consumption is achieved.

An embodiment of the CDMA receiving apparatus, CDMA receiving method, CDMA receiving program and program recording medium will now be described with reference to drawings.

Figure 1:
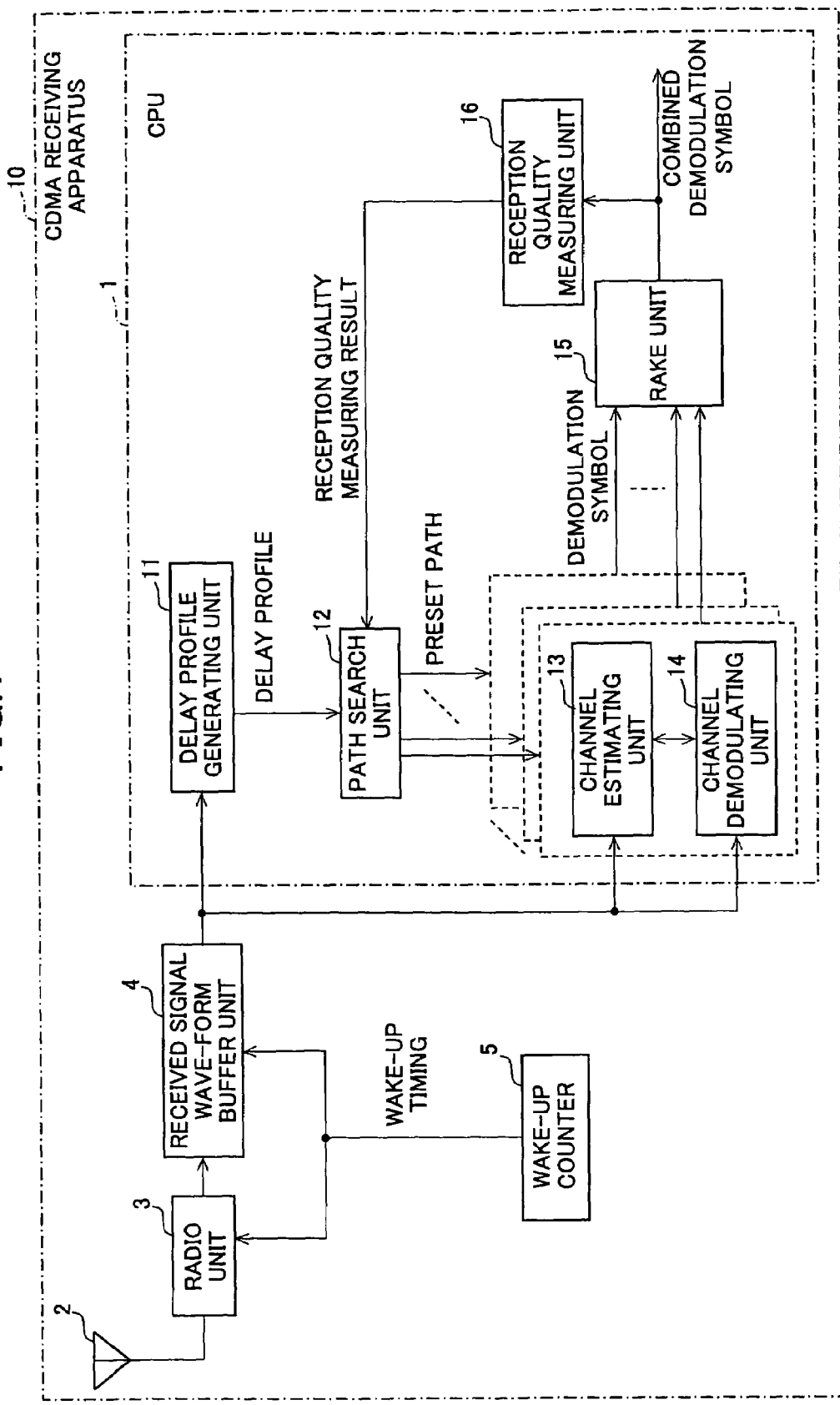
FIG. 1 is a block diagram showing an example of the block configuration of the CDMA receiving apparatus of the present invention.

Now, an example of the CDMA receiving apparatus of the present invention will be described with reference to FIG. 1. FIG. 1 is a block diagram showing an exemplary configuration of the CDMA receiving apparatus of the present invention in which radio signal of CDMA format is received for conducting a channel detection and channel demodulation operation.

In the CDMA receiving apparatus 10 shown in FIG. 1, the wave-form of a signal which is received by a radio unit 3 via an antenna 2 is converted into a digital data representative of the signal wave-form in which its amplitude is digitalized, which is then consecutively recorded on a recording area of a received signal wave-form buffer unit 4, which is determined for each unit processing time.

The received signal wave-form data which is consecutively recorded on the received signal wave-form buffer unit 4 for each unit processing length or each processing time, in which its amplitude is digitalized is consecutively read out to a CPU (Central Processing Unit) 1 on which a real-time operating system (RTOM (Real Time OS)) is installed, and is then processed on a real-time basis. The RTOS is configured to conduct real time processing by executing a plurality of tasks under a control in a parallel manner. The plurality of processing tasks which are operated in a parallel manner under control of RTOS in CPU 1 are configured to execute a channel search function to search peripheral cell condition and a channel demodulating function to demodulate the channel and the like on a real-time basis by receiving data on the received signal wave-form, which is recorded on the received signal wave-form buffer unit 4 and its amplitude is digitalized for conducting numerical calculations.

Although the received signal wave-form buffer unit 4 is connected externally of the CPU 1 in the embodiment shown in FIG. 1, the buffer unit 4 may be incorporated in the CPU 1 as its memory so that it is capable of receiving the received signal wave-form from the radio unit 3 on a real-time basis.

The components which are involved in processing tasks which are in parallel operated in CPU 1 may include a delay profile generating unit 11, path search unit 12, channel estimating unit 13, channel demodulating unit 14, RAKE unit 15 and reception quality measuring unit 16.

In the delay profile generating unit 11, the received signal wave-form data which corresponds to the length of the demodulated symbol which becomes a processing unit is activated each time when it is recorded on the received signal wave-form buffer unit 4. The correlation values which are obtained by multiplying the received signal wave-form data in which its amplitude is digitalized by a desired channel code (channel code of diffusion codes) of the CDMA receiving apparatus 10 at given timing are summed during a predetermined desired length of constraint, or time interval. The signal power values at given timing are consecutively determined, so that a delay profile having a given timing width, that is the delay profile which is representative of the distribution of the signal power value relative to delay time of each path is generated.

If comparison of the signal power value at respective timing in the generated delay profile with a minimum power value which is necessary to identify a received signal in the path search unit 12 shows that the signal power value at a given timing is lower than the necessary minimum power value, the timing is identified as a candidate of a path which is suitable for demodulation. Such comparison processings are conducted for all delay profiles within the range of path search, so that timing position representing each path candidate is detected. For example, 6 demodulation paths to be applied for demodulation are selected from a plurality of path candidates identified as path candidates used for demodulation in decreasing order of signal power value. The respective timings (demodulating path timings) of 6 selected demodulation paths are preset as demodulation paths to be applied for demodulation. In order to obtain a demodulation symbol by multiplying the 6 preset demodulation paths by a demodulation code (a scramble code of diffusion codes) at respective demodulation path timing, the demodulation path timings are supplied to the 6 channel estimating units 13 and 6 channel demodulating units 14 in which parallel demodulation processing is conducted.

In each channel demodulating unit 14 in which each of 6 demodulation path timings for demodulating each of 6 paths is preset, the received signal wave-form data recorded on the received signal wave-form buffer unit 4, which is identical with the data which is used in the delay profile generating unit 11 and the path search unit 12 is multiplied by a demodulation code at demodulating path timings which are preset respectively for diffusion, so that demodulation symbols are generated in unit of one symbol and output. Since the phases between 6 demodulation paths are different from each other, adjustment angles for bringing the symbols in a receiving symbol series between demodulation paths in phase are estimated in the channel estimating unit 13 by using a result of demodulation of a pilot symbol on a pilot channel. The phase relationship between 6 demodulation symbols is adjusted by multiplying the demodulation symbol of each demodulation path by a reciprocal of the adjustment angle. A series of 6 demodulation symbols, the phases of which are adjusted by the channel estimating units 13 and are demodulated by the channel demodulating units 14 are input to the RAKE unit 15. In the RAKE unit 15, input 6 symbols are multiplied by a coefficient which is suitable in unit of symbol of each demodulation path and are summed for path combining. The sum is output from the RAKE unit 15 as a combined demodulation symbol representing a result of demodulation.

The received signal wave-forms which are received by the radio unit 3 are consecutively recorded on the received signal wave-form buffer unit 4 as data on the received signal wave-forms. The received signal wave-form data is determined as delay profile in the delay profile generating unit 11 using a channel code and desired length of constraint. A path search is conducted in the path search unit 12 based upon the delay profile, so that demodulation paths which is as many as the predetermined number of the paths are selected. The received signals of respectively paths are demodulated in the channel estimating units 13 and the channel demodulating units 14 by using again the same received signal wave-form data recorded on the received signal wave-form buffer unit 4. The timings of the demodulated symbols are adjusted. The demodulated symbols of the demodulation paths are combined by the RAKE unit 15. Since the received signal wave-forms are all identical and no result of the processing of previously received signal wave-forms are used, the receiving apparatus is capable of positively coping with abrupt occurrence or disappearance of a path or change in phase of symbol.

The combined demodulated symbol which is a result of demodulation is input to the reception quality measuring unit 16 in which the combined demodulated symbol is compared with the pilot pattern which is preset on the pilot channel, so that the quality of reception of the demodulated result is measured by counting the number of errors of the received signals. In other words, the measurement of quality of reception of the reception quality measuring unit 16 is determined by comparing the demodulation result on the pilot channel (combined demodulation symbol) with the pilot pattern to count the number of errors of reception. The result of measurement of reception quality, which is determined by the reception quality measuring unit 16 is compared with a preset reference value. The path search unit 12 is activated again depending upon whether or not the reception quality is lower than the preset reference value. A path search sequence is configured to repeat path searches to change the combination of the demodulation paths which has been determined until a result of demodulation having a good reception quality can be obtained.

More specifically, the delay profiles are determined from the received signal wave-forms in the delay profile generating unit 11. The position of the timing having the peak power value which is higher than necessary minimum power value is detected as a path candidate from the delay profiles by conducting a path search in the path search unit 12. A combination of the paths which can be considered as optimum for demodulation is selected from the path candidates. Demodulation is conducted with timings of respective demodulation paths by using the received signal wave-form data which are identical with those used for generating the delay profiles in the channel estimating units 13 and the channel demodulating units 14. After bringing the demodulated paths in-phase, the demodulated symbols of demodulation paths are combined in the RAKE unit 15 for outputting a combined demodulated symbol.

In a reception environment in which receiving condition is deteriorated so that the signal to noise ratio is lowered, when a noise power peak is momentarily generated, so that an erroneous power peak may be detected as a power peak of the received signal. Accordingly, if the deterioration of the reception quality is detected in the reception quality measuring unit 16, a demodulation path is reselected by different combination of the already detected path candidates, so that demodulation of the same received signal wave-form data is conducted again. This makes it possible to compensate for the erroneous selection of demodulation path in the path search unit 12 for improving the characteristics of error detection of the demodulated symbols. Measurement of the reception quality in the reception quality measuring unit 16 is conducted by comparing the result of reception of the pilot channel with the predetermined pilot pattern to count the number of reception errors for calculating the error rate.

Figure 2:
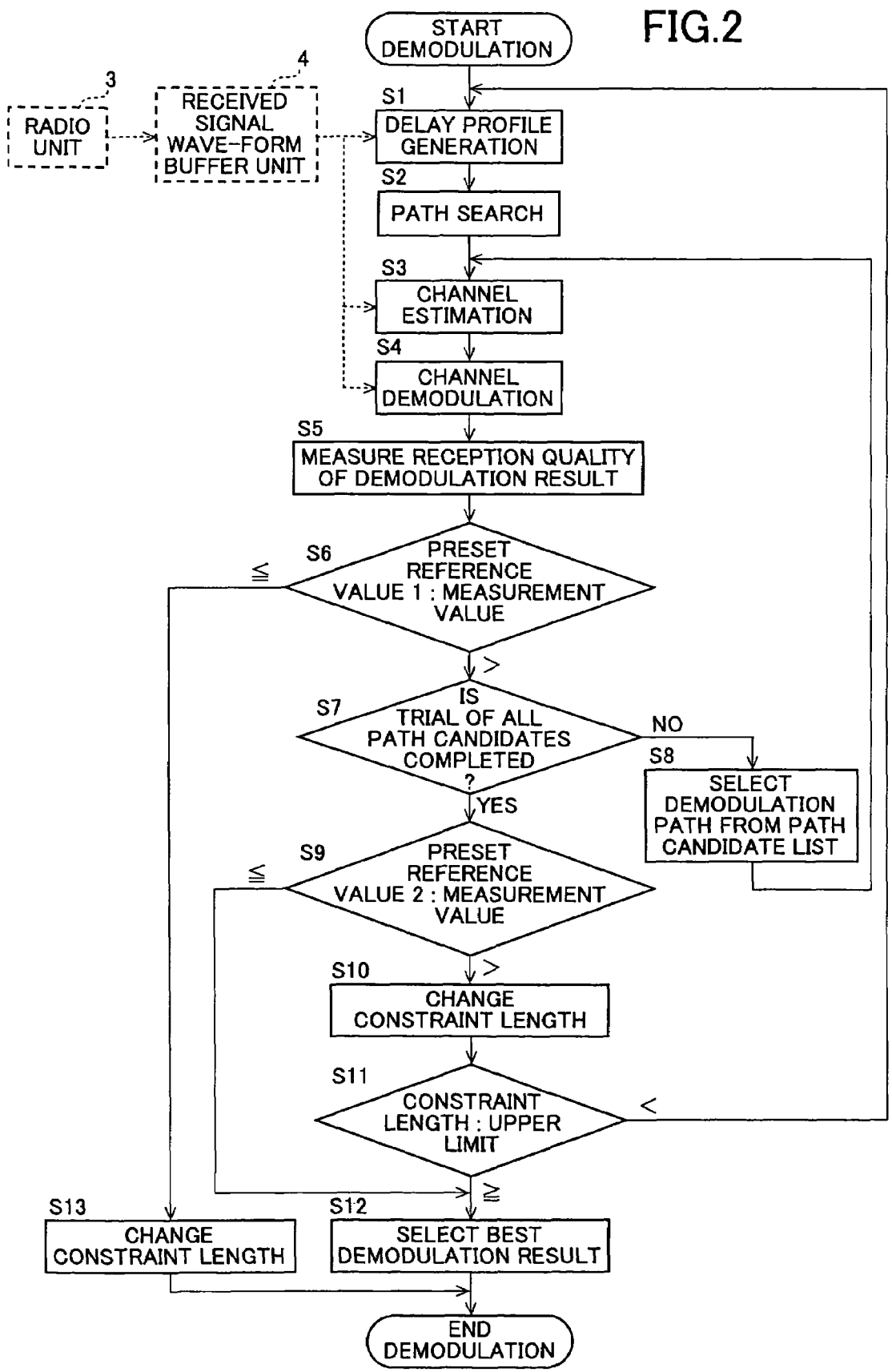
FIG. 2 is a flow chart sequence operation in the CDMA receiving apparatus of the present invention and FIG. 3 is a schematic view explaining the generation of the delay profile for detecting a path based upon the power level of the received signal.
Figure 3:
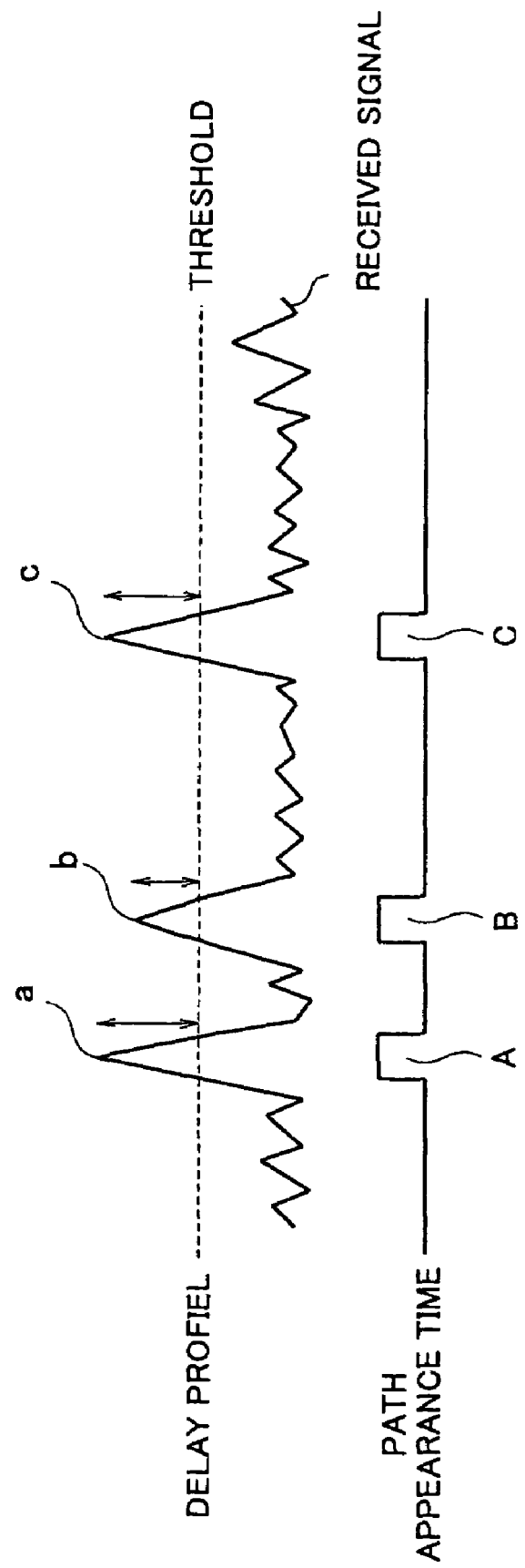

Now, an example of path search sequence operation will be described with reference to an operation flow chart of FIG. 2. FIG. 2 is a flow chart explaining an example of a path search sequence operation in the CDMA receiving apparatus of the present invention.

In the operation flow chart of FIG. 2, delay profiles each having a processing unit length, which are necessary for path search are generated by using the received signal wave-form data recorded in the received signal wave-form buffer unit 4 by the delay profile generating unit 11 as mentioned above (step S1) Then, for example, 6 demodulation paths are selected by conducting a path search in the path search unit 12 (step S2) An adjustment angle for correcting the relation between the phases of 6 demodulation paths is determined by the channel estimating units 13 by using the received signal wave-form data which is the same as the data used for generating the delay profiles (step S3). Demodulating processing of 6 demodulation paths is conducted by the channel demodulating units 14 by using the received signal wave-form data which is same as the data used for the generation of 6 demodulation paths, so that obtained demodulated symbols are output to the RAKE unit 15 on one-symbol unit basis (step S4) The demodulated symbols are combined into one symbol unit by the RAKE unit 15 for path combination, so that it is output as a combined demodulated symbol and measurement of the reception quality of the demodulation result is conducted in the reception quality measuring unit 16 (step S5)

If the result of selection of the demodulation paths in the path search unit 2 at step S2 shows that the result of reception quality measurement which is conducted by the reception quality measuring unit 16 is lower than the preset reference value 1, so that the deterioration of the received signal quality is detected (in case of ">" at step S6) and combinations of all path candidates which are path search results in the path search unit 12 have not completed (NO at step S7), 6 demodulation paths which are a different combination are reselected from path candidates (step S8). Operation will return to step S3. Channel estimation by the channel estimating units 13 (step S3), channel demodulation by the channel demodulating units 14 (step S4) and reception quality measurement by the reception quality measuring unit 16 (step S5) are repeated again using the same received signal wave-form data.

If a result of thus repeated operation shows that the received signal quality is continued to be lower than said preset reference value 1 (in case of ">" at step S6) and all combinations of the path candidates are completed (YES at step S7), then a determination is made whether or not the reception quality measurement result is higher than a preset reference 2 (that is, a second preset reference value) which is lower than said preset reference value 1 (step S9). If the reception quality measurement result is not lower than the present reference value 2 (in case of " " at step S9), then a combination of the path candidates having the highest reception signal quality is selected from all combination of the tried path candidates (step S12), and demodulation processing is completed.

If the magnetic wave receiving condition deteriorates, so that the fact that the received signal quality is lower than said preset value 1 is detected in the reception quality measuring unit 16 (in case ">" at step S6), a path which has not been selected from the path candidates of the delay profile is newly added to the demodulation paths or replaced at the path search unit 12 (step S8) so that demodulation processing of the received signals is repeated again. By consecutive trials of combinations of the demodulation paths which are possible for selecting path candidates, it is possible to select a combination of paths on which reception error has not occurred, resulting in an improvement in reception error characteristics of combined demodulated symbols.

If the result of the reception quality measurement does not exceed said preset reference value 2 (in case of ">" at step S9), the length of the constraint which is preset in the delay profile generating unit 11 is changed so that it is longer by a predetermined length (step S10). If the changed length of the constraint is shorter than a predetermined upper value (in case of "<" at step S11), operation will return to step S1. The delay profiles are generated again by the delay profile generating unit 11 based upon the changed length of the constraint (step S1). A path search is reconducted using the regenerated detailed delay profiles by the path search unit 12 (step S2).

If the reception quality measurement result does not exceed said preset reference value 2 (in case of ">" at step S9) and the changed length of the constraint is equal to and longer than the predetermined upper limit value (in case of " " at step S11), operation will proceed to step S12 at which a combination of path candidates having highest received signal quality is selected from the combinations of tried path candidates (step S12) and demodulation processing is ended.

If the received signal quality exceeds said preset reference value 1 (in case of "≦" at step S6), the demodulation processing is ended assuming that the received signal quality be in the good level not lower than the predetermined level. If the reception quality measuring result which is measured by the reception quality measuring unit 16 based upon the symbols demodulated by the channel demodulating unit 14 exceeds said preset reference value 1 (in case of "≦" at step S6), the length of the constraint of the delay profile generating unit 11 is preset to be shorter by a predetermined length (step S13) so that the burden on processing can be mitigated by avoiding the generation of delay profiles which are more detailed than required in the delay profile generating unit 11 at subsequent steps. Processing to preset the length of the constraint shorter at step S13 is valid only in the stand-by state, so that good receiving condition may be kept in a normal reception without shortening the length of the constraint at subsequent steps.

Since the signal power peak of each reception path existing in the delay profiles which are generated in the delay profile generating unit 11 is in the high level in comparison with the noise power peak when the receiving condition is good, the signal power peak can be accurately detected by the path search unit 12 at timing position of the receiving path of the received path for selecting a modulation path even if the signal component of the received signal is weakened. Accordingly, if the result of the reception quality measurement exceeds said preset reference value (in case of " " at step S6), reduction in power consumption of CPU 1 and speeding up of processing can be achieved by shortening the constraint length to mitigate the operation burden in the delay profile generating unit 11 at subsequent steps (step S13) The processing for shortening the constraint length is not conducted on normal reception of communication signal from a remote office, and may be conducted only in stand-by state so that no adverse influence is given to the normal communication quality.

Conversely, the receiving condition deteriorates, so that the ratio of the signal power peak to the noise power peak becomes lower. If it is difficult to appropriately select the signal power peak (in case of ">" at step S9) since the reception power peak is lower than said preset reference value 2 which is lower than said preset reference value 1, by. making the constraint length in the delay profile generating unit 11 longer (step S10), the delay profile relative to the same received signal wave-form data is reproduced (step S1) to make it possible to select correct path in the path search unit 12 (step S2). Although processing burden on CPU 1 and power consumption increases in this case, the reception error detection characteristics can be improved.

If the received signal quality which is not lower than said preset reference value 1 can not be obtained as mentioned above, a path candidate having the highest received signal quality is selected as a modulation path after the trials of all combinations of path candidates. If the received signal quality higher than said preset reference value 1 can not be obtained and the quality which is higher than said preset reference value 2 which is preset lower than said preset reference value 1, the constraint length which is applied to the generation of the delay profile is progressively increased to said predetermined upper limit value. Then the same trial is repeated again, the operation to change the constraint length may be conducted immediately if the received signal quality higher than said preset reference value 1 can not be obtained as well as if the quality which is higher than said preset reference value 2, which is preset lower than said preset reference value 1 can not be obtained.

The received signal wave-form buffer unit 4 which records data of the wave-forms of radio signals which are received by the radio unit 3 is divided into recording areas for each unit processing time as mentioned above. The recording areas of the received signal wave-form buffer unit 4 keep their contents recorded thereon until demodulation is completed by performing a series of processing using the received signal wave-form data. The recording areas are immediately triggered to free by the fact that all processing relating to channel demodulation and channel estimation are completed. Thus, the recording areas which are cleared can be repeatedly used for recording subsequently received signal wave-form data. It makes it possible to suppress the recording capacity of each recording area to record the received signal wave-form data for each unit processing time, which requires real-time processing to a minimum and to prevent the recording capacity of the received signal wave-form buffer unit 4 from increasing.

Now, an exemplary operation for receiving signals on a stand-by channel in the CDMA receiving apparatus 10 of the prevent invention will be described with reference to block diagram of FIG. 1. The CDMA receiving apparatus 10 shown in FIG. 1 comprises a wake-up counter 5 for outputting a wake-up timing signal substantially in synchronization with the transmission timing of the stand-by information transmitted from a base station. The power to the radio unit 3 and the received signal wave-form buffer unit 4 is turned off for a stand-by period of time until the wake-up timing signal is output from the wake-up counter 5.

When a signal on the stand-by channel is received, the stand-by information of the receiving station, that is, CDMA receiving apparatus 10 is transmitted with given transmitting timings from a base station at predetermined intervals. In order to receive the stand-by information of the receiving station, a wake-up timing signal which is substantially synchronized with the transmitting timing is generated by the wake-up counter 5. The power to the radio unit 3 and the received signal wave-form buffer unit 4 is turned on by using the wake-up timing signal as a trigger. The data on received signal wave-form having a duration which is considered enough to include the stand-by information on the receiving station is recorded on the received signal wave-form buffer unit 4. Since the operation of the radio unit 3 is not required after completion of the recording, the power to the radio unit 3 is turned off. Thereafter, in order to demodulate signals on the stand-by channel by the CPU 1 using the received signal wave-form data which is recorded on the received signal wave-form buffer unit 4, the power to CPU 1 is turned on. When all the modulation is completed, the CDMA receiving apparatus 10 turns off the power to all units including CPU 1 other than the wake-up counter 5 to keep a sleep state until next wake-up timing signal is generated.

The operation of the CDMA receiving apparatus 10 will be described in more detail. When the wake-up timing signal is output from the wake-up counter 5 substantially in synchronization with the transmission timing at which the stand-by information of the receiving station is transmitted at predetermined intervals to mobile CDMA received apparatus 10 (receiving terminal) from a base station, the wake-up timing signal is input to the radio unit 3 and the received signal wave-form buffer unit 4 as a trigger signal. The power to radio unit 3 and the received signal wave-form buffer unit 4 is turned on when the trigger signal is input thereto. The wave-form of the signal which is received via the antenna 2 is digitalized into received signal wave-form data via the radio unit 3, so that an operation for consecutively recording the data on recording areas of the received signal wave-form buffer unit 4 which are different for each processing time is activated.

In order to investigate the receiving environment of the CDMA receiving station, on the CDMA receiving apparatus 10 in parallel with the demodulation of the stand-by information when the signals on the stand-by channel are received, it is necessary to conduct channel detection relating to peripheral cells. Accordingly, it is necessary to acquire received signal wave-form data having a duration which is required to search for the peripheral cells as the received signal wave-form data recorded on the received signal wave-form buffer unit 4 on demodulation of the stand-by information. Cell search processing as well as the demodulation relating to the stand-by information will be conducted by using the received signal wave-form data.

In such manner, the received signal wave-form data which is recorded on the received signal wave-form buffer unit 4 includes a received signal representing the stand-by information of its own receiving station as well as the wave-form of the received signal having a duration which is required to execute the channel detection processing of the peripheral cells, when the recording on the received signal wave-form buffer unit 4 is completed, the power to radio unit 3 is turned off. In order to conduct a signal processing based upon the received signal wave-form data of the received signal wave-form buffer unit 4, the power to CPU 1 is turned on. The CPU 1 executes the channel demodulation processing for receiving the stand-by information and the channel detection processing of the peripheral cells with reference to the received signal wave-form data recorded on the received signal wave-form buffer unit 4. When a result of processing of the stand-by information is obtained, the power to all units including CPU 1 other than the wake-up counter 5 is turned off.

If the result of the reception quality measurement which is measured by the reception quality measuring unit 16 based upon the demodulated and combined symbol which is obtained by modulating and combining the stand-by information by means of the channel demodulating unit 14 and the RAKE unit 15 as shown in FIG. 2 is lower than said preset reference values 1, a trial to reselect and remodulate the combination of paths to be preset from the path candidates is repeated. If the reception quality of the stand-by information is lower than said reference value 2 lower than said preset reference value 1 after trials of reselection and redemodulation of all combinations, the constraint length of the delay profile generating unit 11 is changed longer and the operation to demodulate the stand-by information is repeated. If the reception quality measurement which is measured by the reception quality measuring unit 16 based upon the demodulated and combined symbol which is obtained by modulating and combining the stand-by information by means of the channel demodulating unit 14 and the RAKE unit 15 is so good that it is. not lower than said present reference value 1, the constraint length may be preset shorter to mitigate the processing burden without generating delay profiles which are more detailed than required at subsequent steps.

If an error of the received signal occurs due to the fact that the radio wave condition is deteriorated during the reception of the stand-by information as mentioned above, the length of the constraint applied to the delay profile which is generated every timing by the delay profile generating unit 11 for use in the path search unit 12. If the constraint length is made longer, burden of computation upon the delay profile generating unit 11 would be increased. If reception errors are repeated, a channel detection operation for redetecting all peripheral cells is frequently repeated, so that power consumption will increase greatly.

Accordingly, a result in which the errors of the received signal are less can be obtained by re-determining the more detail delay profile based upon the received signal wave-form data which is identical with that on the preparation of previous delay profile by making the constraint length applied to the delay profile generating unit 11 longer within the range of a predetermined pitch so that the total power consumption is minimum and by selecting more accurate path as demodulating path in the path search unit 12 and conducting demodulation processing again using such demodulation path. It is possible to obtain a desired reception quality by repeating such processing until a good reception quality which is higher than a desired preset reference value 1 and/or the preset reference value 2 (second preset reference value) which is preset lower than said preset reference value 1.

If the radio wave condition is so good that no error occurs in the demodulation result during the reception of stand-by information, the constraint length of the delay profile generating unit 11 is longer than required, so that the delay profile which is more detail than required may be determined. Hence, it is also possible to reduce the processing burden by making the constraint length shorter to generate the delay profile in the delay profile generating unit 11 when the received signal wave-form of next processing unit is processed.

As mentioned above, a series of channel estimating processing and channel demodulation processing and a sequence of demodulation processing of the stand-by information and search (detection) processing of peripheral cells using the received signal wave-form data recorded on the received signal wave-form buffer unit 4 during reception and stand-by of the signal have been provided as mentioned above. Processing such as generation of the delay profile and path search which are repeated are implemented by a program which is executed under control of RTOS of CPU 1 as shown in FIG. 1. The present invention is not limited to the above-mentioned CDMA receiving apparatus. In order to make the processing speed faster, the CDMA receiving apparatus may be configured so that the channel estimating unit 13 and the channel demodulating unit 14 are disposed in a parallel manner for each of several paths by devoted hardware although it is advantageous in cost. Any one or more of the delay profile generating unit 11, path search unit 12, RAKE unit 15, reception quality measuring unit 16 as well as the channel estimating unit 13 and channel demodulating unit 14 may be formed of hardware. Alternatively, the receiving apparatus may be formed of a combination of hardware and software (program) if needed.

The CDMA receiving apparatus of the present invention comprising the above-mentioned technical means, CDMA receiving method, CDMA receiving program and program recording medium have the effects as follows:

When the received signals are RAKE combined and output as a combined demodulation symbol, the received signal wave-form data which is recorded on the received signal wave-form buffer unit at the same time is used as the received signal wave-form data (digital data in which the amplitude is digitalized) used for each processing such as the delay profile generating processing, path search processing, channel estimating processing and channel demodulation processing. The received signal wave-form data at different time such as past time is never used as the received signal wave-form data used for respective processing. Even if the receiving environment abruptly changes, so that a path abruptly occurs or disappears, or the phase of the demodulation symbol changes, received signal can be properly demodulated without losing any received signal at each time, so that deterioration of the received signal quality can be prevented.

If the quality of the combined demodulation symbol relating to demodulation path comprising a combination of a given number of paths which are determined as optimum and selected from a plurality of path candidates which are detected as a received signal having a signal power level which is higher than a given signal level (minimum signal power level) which is predetermined as a path search result becomes lower than a predetermined value (preset reference value), so that deterioration of the receiving condition is detected, momentarily generated noise power peak may be erroneously detected as the signal power peak, so that it is selected as demodulation path. Accordingly, since a combination of different paths is reselected again as the demodulation path from said path candidates until the quality of the combined demodulation symbol exceeds said predetermined value (preset reference value), erroneous selection for path search can be compensated for and deterioration of the received signal quality can be prevented.

If the quality of the combined demodulation symbol relating to demodulation path comprising a combination of a given number of paths which are determined as optimum and selected from a plurality of path candidates detected as a received signal having a signal power level which is higher than a given signal level predetermined as a path search result becomes lower than a predetermined value (preset reference value), so that deterioration of the reception condition is detected, an erroneous path can be selected as demodulation path due to the lowering of the signal to noise ratio, momentary generation of the noise power peak, or momentary lowering of the signal power peak. Accordingly, all path candidates which are different combinations are reselected as demodulation paths. Even if the quality of each combined demodulation path which is determined in combination of respective demodulation paths is lower than said given value (preset reference value), excessive deterioration of the received signal quality can be prevented by outputting a combined demodulation symbol having best quality from the combined demodulation symbols which is lower than said given value (preset reference value) and higher than a predetermined second reference value.

If the quality of the combined demodulation symbol relating to demodulation paths comprising combinations of a given number of paths which are selected optimum from a plurality of path candidates which are detected as received signals having a signal power level higher than a given signal level which is predetermined as a path search result becomes lower than a predetermined value (preset reference value), so that deterioration of the receiving condition is detected, the constraint length which is used for generating the delay profile is preset longer by a predetermined length for generating more detail delay profile when the quality of the combined demodulation symbol is higher than said given value (preset reference value) for all combinations if all path candidates of different combinations are reselected as demodulation paths or when the quality is not higher than said second preset reference value which is preset lower than said given value (preset reference value). It is possible to newly add to path candidates a path which is not included in path candidates detected based upon the delay profile which is generated with previous constraint length or replace it by reconducting a path search. It becomes possible to conduct demodulation again by detecting a combination of more accurate paths which causes no error. This improves the reception error rate of the demodulation symbol and prevents the received signal quality from deteriorating.

If the quality of the combined demodulation symbols relating to the demodulation path comprising a combination of a given number of paths which are determined and selected as optimum from a plurality of path candidates detected as received signals having a signal power level higher than a predetermined signal level is higher than a predetermined value (preset reference value), so that reception condition is good, the ratio of the signal power peak which is represented by each path in the delay profile generated in the delay profile generating unit to the noise power peak is large. Accordingly, even if the signal power component is decreased by shortening the constraint length at each time, it is possible to properly detect the signal power peak in the delay profile for accurately selecting a demodulation path for demodulating the received signal. Speeding up of processing and reduction in power consumption can be achieved by making the constraint length shorter to reduce the burden of arithmetic operation upon the delay profile generating unit.

If the reception condition deteriorates so that the quality of the combined modulation symbol is not higher than said given value (preset reference value) for combination of all paths which are selectable as modulation path, or if the quality is not higher than said second preset reference value, the ratio of the signal power peak to noise power peak decreases, so that it is difficult to accurately select the signal power peak. This increases the processing burden and power consumption. It is possible to select a combination of accurate paths as a modulation path by making the length of the constraint longer to generate more detail delay profile, so that the reception error can be improved.

It is possible to conduct a channel receiving operation in parallel with a channel demodulating operation by consecutively recording the received signal wave-forms on different recording areas of the received signal wave-form buffer unit for each unit processing unit or on each processing time. It is possible to record next received signal wave-form data by clearing the recording area immediately after the combined demodulation symbol relating to the received signal wave-form data on the recording area at a unit processing length is properly output. Accordingly, the recording areas are not kept in a used state for a long period of time. The recording capacity of the received signal wave-form buffer unit can be reduced, so that reduction in cost can be achieved.

Since the stand-by information of a receiving apparatus is transmitted from a base station with a given timing for a constant period, a wake-up timing signal is output. The power to the radio unit which receives the stand-by information and the received signal wave-form buffer unit which records the received signal wave-form data on the stand-by information is triggered to turned on in response to the wake-up timing signal. The received signal wave-form data is recorded on the received signal wave-form buffer unit for a period of time which is considered so enough that the stand-by information is received for recording. When the recording is completed, the power to the radio unit is turned off. Thereafter, demodulation of the stand-by information is performed by using the received signal wave-form data concerning to the stand-by information recorded on the received signal wave-form buffer unit. The power to all units other than the wake-up counter which counts the wake-up timing is turned off when the demodulation concerning to the stand-by information is completed. Since sleep state is continued until next wake-up timing, reduction in power consumption can be achieved.

Since it may be necessary to conduct a channel detecting operation relating to peripheral cells depending upon a result of the demodulation of the stand-by information, the power to the radio unit is continued to turn on until the received signal wave-form data for a period of time required for the channel detection concerning the peripheral cells is recorded on the received signal wave-form buffer unit in order to investigate receiving environment of its own receiving apparatus (its own station) in lieu of turning off the radio unit after the lapse of enough time to complete the recording of the stand-by information. When recording of the received signal wave-form data for channel detection related with the peripheral cells is assumed to be completed, the power to the radio unit is turned off. It is possible to turn off the power to all units other than the wake-up counter when the channel detection operation related with the peripheral cells is completed in lieu of the completion time of the demodulation related with the stand-by information. Necessity of implementing in a parallel manner processing systems which are capable of simultaneously performing the channel demodulation and channel detection operations related with stand-by information or peripheral cells can be eliminated while reduction in power consumption is achieved and the received signal wave-form buffer unit is provided. Reduction in manufacturing cost of the receiving apparatus can be achieved.

If a reception error is generated due to the deterioration of the radio wave condition during the reception of the stand-by information, there is a possibility that the constraint length of the delay profile of each time used for detecting paths to demodulate the stand-by information is insufficient. If the constraint length is preset to a large value similarly to the case of the above-mentioned received signal demodulation, the burden of calculation to generate the delay profile increases to provide increased power consumption. On the other hand, since repetition of reception error related with stand-by information causes the channel detection operation for redetecting all peripheral cells to be frequently performed, the consumption conversely increases.

Accordingly, in order to reduce power consumption as much as possible, the constraint length for generating the delay profile is made longer by a predetermined length and more detail delay profile is regenerated by using the received signal wave-form data related with the same stand-by information recorded on the received signal wave-form buffer unit. Demodulation processing related with the same stand-by information is conducted again by detecting accurate paths as a combination of the demodulating path used for the demodulation of the stand-by information. A demodulation result having less reception error can be obtained and reduction in total power consumption can be achieved. If the received signal wave-form data which becomes next processing unit is processed, occurrence of reception error can be prevented from the beginning on demodulation operation related with next stand-by information by continuously using said constraint length which has been changed.

If the radio reception condition is so good during reception of the stand-by information that no reception error occurs in the result of the demodulation of the stand-by information, there is a possibility that a delay profile which is more detailed than required is determined due to excessive constraint length used for generating the delay profile. Thus, when the received signal wave-form data related with the stand-by information which becomes next processing unit is processed, more coarse delay profile is generated by making the constraint length shorter by a predetermined length, so that mitigation of processing burden and reduction in power consumption can be achieved.

The present invention is configured to perform channel estimating processing, channel demodulating processing, demodulating processing of stand-by information, and detection processing of peripheral cells. Any one or more of processing units which perform these processings such as delay profile generating processing for generating delay profiles, path search processing for selecting demodulation path, channel demodulating processing for obtaining a demodulating processing for obtaining a demodulation symbol of each demodulation path, channel estimating processing for aligning the phases of the demodulation symbols of each demodulation path, RAKE combining processing for combining demodulation symbols of each demodulation path to output them, and reception quality measuring processing for measuring the reception quality may be performed by a program which is executed under control of RTOS (real time operation system) of CPU (central processing unit) This configuration using a program is simpler and less costly in comparison with the configuration in which a delay file generating unit, path search unit, RAKE unit and reception quality measuring unit which conduct a series of demodulation processing, and channel estimation and a sequence of the detection processing of peripheral cells, as well as channel estimating units and channel demodulating unit which are to be arranged in a parallel manner and the number of which corresponds to that of the paths are formed of devoted hardware.

The invention claimed is:

1. A CDMA receiving apparatus which receives radio-signal of CDMA scheme to perform a channel detection and channel demodulation operations, wherein said apparatus comprises:

a received signal wave-form buffer unit which digitalizes the amplitude of the wave-form of the signal which is received by a radio unit for recording the signal as data on the received signal wave-form;

a delay profile generating unit for generating a delay profile which represent the distribution of signal power value relative to delay time on a path by calculating as a signal power value a sum of correlation values which are obtained by multiplying said received signal wave-form data by a desired channel code over a time interval which is provided as a predetermined desired length of constraint if the time length of said received signal wave-form data recorded on said received signal wave-form buffer unit becomes a predetermined processing unit length;

a path search unit for obtaining the time of respective demodulation paths by detecting the time at which the signal power value of said delay profile peak to detect path candidates used for demodulating said received signal and to select the demodulation paths which are to be applied for demodulation, having a number not more than predetermined maximum number of paths;

a channel estimating unit for demodulating pilot symbols of respective demodulation paths by determining the correlation between said received signal wave-form data recorded on the received signal wave-form buffer unit and demodulation code assigned to said CDMA receiving apparatus on a symbol unit basis at said time of said respective demodulation paths which are selected by said path search unit and for estimating an adjustment angle for aligning phases of said respective demodulation paths from a result of demodulation of said pilot symbols;

a channel demodulating unit which determines correlations between said received signal wave-form data recorded on said receiving signal wave-form buffer unit and said demodulation code at said time of said respective selected demodulation paths, as demodulation symbols on a symbol unit basis and for adjusting the phases of the symbols which are determined for each demodulation path based upon said adjustment angle of said each demodulation path which is estimated by said channel estimating unit;

a RAKE unit which combines said demodulation symbols of said respective demodulation paths, the phases of which are aligned to obtain combined demodulation symbols for outputting them; and a reception quality measuring unit for measuring the reception quality by comparing said combined demodulation symbols related with said pilot symbols of said combined demodulation symbols with a predetermined pilot pattern, and in that said demodulation paths which are selected in said path search unit are changed depending upon whether or not said reception quality measured by said reception quality measuring unit is lower than a predetermined preset reference value.

2. A CDMA receiving apparatus as defined in claim 1, wherein if said reception quality which is measured by said reception quality measuring unit is lower than said preset reference value, a different combination of paths having a number not more than predetermined maximum number of paths is reselected by said path search unit as said demodulation paths to be applied to demodulation and in that estimating said adjustment angle of each path by said channel estimating unit, channel demodulating by said channel demodulating unit, combining of said demodulation symbols by said RAKE unit and measuring of said reception quality by said reception quality measuring unit are repeated again by using said same received signal wave-form data recorded on said received signal wave-form buffer unit.

3. A CDMA receiving apparatus as defined in claim 1, wherein if said reception quality which is measured by said reception quality measuring unit is lower than said preset reference value, a different combination of a predetermined number of paths is reselected as said demodulation paths to be applied to demodulation from said path candidates and in that estimating said adjustment angle of each path by said channel estimating unit, channel demodulating by said channel demodulating unit, combining of said demodulation symbols by said RAKE unit and measuring of said reception quality by said reception quality measuring unit are repeated again by using said same received signal wave-form data recorded on said received signal wave-form buffer unit, and if said reception quality measured by said reception quality measuring unit is lower than said preset reference value for all combinations of said repeated demodulation paths to be applied to demodulation by said path search unit, a combination of said demodulation paths having best reception quality is selected from combinations of said demodulation paths having a reception quality which is not lower than a second reference value which is preset lower than said preset reference value so that said combined modulation symbol which is combined by said RAKE unit is output.

4. A CDMA receiving apparatus as defined in claim 1, wherein if said reception quality measured by said reception quality measuring unit is lower than said preset reference value or is lower than a second reference value which is preset as a value lower than said preset reference value, said constraint length in said delay profile is set longer by a predetermined length, and in that selecting said demodulation paths by said path search unit, estimating said adjustment angle of each path by said channel estimating unit, channel demodulating by said channel demodulating unit, combining of said demodulation symbols by said RAKE unit and measuring of said reception quality by said reception quality measuring unit are repeated again by using said same received signal wave-form data recorded on said received signal wave-form buffer unit.

5. A CDMA receiving apparatus as defined in claim 1, wherein if said reception quality is not lower than said preset reference value, said constraint length in said delay profile which is applied to subsequent received signals is set shorter by a predetermined value.

6. A CDMA receiving apparatus as defined in any one of claims 1 to 5, wherein said received signal wave-form buffer unit comprises a plurality of recording areas which are different for each of said processing unit lengths, for recording said received signal wave-form data and in that said received signal wave-form data on the signals which are received by said radio unit until output processing of said combined demodulation symbols by said RAKE unit using said received signal wave-form data recorded on any of said recording areas is completed is recorded on a recording area which is different from said recording area and in that when said output processing of said combined demodulation symbols using said received signal wave-form data recorded on said different recording area is completed, said different recording area is immediately cleared for recording.

7. A CDMA receiving apparatus as defined in any of claims 1 to 5, wherein said CDMA receiving apparatus further includes a wake-up counter which counts a predetermined wake-up timing which is substantially synchronized with the transmission timing of stand-by information transmitted from a broadcasting station on a stand-by channel, in that when said wake-up counter counts out said wake-up timing, the power to said radio unit and said received signal wave-form buffer unit is turned on for receiving and recording said stand-by information on said stand-by channel and the power to said radio unit is turned on at the timing when a period of time elapses which is long enough to receive said stand-by information by said radio unit and to record said received signal wave-form data of said received stand-by information on said received signal wave-form buffer unit.

8. A CDMA receiving apparatus as defined in claim 7, wherein the power to said delay profile generating unit, said path search unit, said channel estimating unit, said channel demodulating unit, said RAKE unit and said reception quality measuring unit is turned on at a time to conduct a demodulation operation related with said received stand-by information when a period of time enough to record on said received signal wave-form buffer unit elapses and the power to said all units other than said wake-up counter is turned off at a time when the demodulation operation related with said stand-by information is completed.

9. A CDMA receiving apparatus as defined in claim 7, wherein the power to said delay profile generating unit, said path search unit, said channel estimating unit, said channel demodulating unit, said RAKE unit and said reception quality measuring unit is turned on at a time to conduct a demodulation operation related with said received stand-by information when a period of time enough to record on said received signal wave-form buffer unit elapses and the power to said all units other than said wake-up counter is turned off at a time when the demodulation operation related with said stand-by information is completed, and the power to all units other than said wake-up counter is turned off when a channel detection operation related to peripheral cells is completed in lieu of the time when the demodulation operation related with said stand-by information is completed if the channel detecting operation related with the peripheral cells is required in association with the demodulation operation related with said stand-by information.

10. A CDMA receiving apparatus as defined in claim 7, wherein the power to said radio unit is turned off at a time when the period of time enough to record said received signal wave-form data related with said stand-by information on said received signal wave-form buffer unit plus the period of time to record on said received signal wave-form buffer unit, the received signal wave-form data required for channel detection related with peripheral cells which may be executed in association with said stand-by information elapses.

11. A CDMA receiving apparatus as defined in claim 7, wherein
if said reception quality related with said stand-by information measured by said reception quality measuring unit is lower than said preset reference value or is lower than a second reference value which is preset as a value lower than said preset reference value, said constraint length in said delay profile is set longer by a predetermined length, and
in that
estimating said adjustment angle of each path by said channel estimating unit,
channel demodulating by said channel demodulating unit,
combining of said demodulation symbols by said RAKE unit and
measuring of said reception quality by said reception quality measuring unit
are repeated again by using said same received signal wave-form data related with said stand-by information recorded on said received signal wave-form buffer unit.

12. A CDMA receiving apparatus as defined in claim 7, wherein if said reception quality related with said stand-by information is not lower than said preset reference value, said constraint length in said delay profile which is applied to subsequent stand-by information is set shorter by a predetermined value.

13. A CDMA receiving apparatus as defined in any of claims 1 to 5, wherein hardware logic of any one or more of said delay profile generating unit, said path search unit, said channel estimating unit, said channel demodulating unit, said RAKE unit and said reception quality measuring unit are implemented by a program, which is executed by an operation and processing device included in said CDMA receiving apparatus.

14. A CDMA receiving method which receives radio-signal of CDMA scheme to perform channel detection and channel demodulation operations, wherein there is provided a received signal wave-form buffer unit which digitalizes the amplitude of the wave-form of the signal which is received by a radio unit for recording the signal as data on the received signal wave-form, in that said method comprises:
a delay profile generating step for generating a delay profile which represent the distribution of signal power value relative to delay time on a path by calculating as a signal power value a sum of correlation values which are obtained by multiplying said received signal wave-form data by a desired channel code over a time interval which is provided as a predetermined desired length of constraint if the time length of said received signal wave-form data recorded on said received signal wave-form buffer unit becomes a predetermined processing unit length;
a path search step for obtaining the time of respective demodulation paths by detecting the time at which the signal power value of said delay profile peak to detect path candidates used for demodulating said received signal and to select the demodulation paths which are to be applied for demodulation, having a number not more than predetermined maximum number of paths;
a channel estimating step for demodulating pilot symbols of respective demodulation paths by determining the correlation between said received signal wave-form data recorded on the received signal wave-form buffer unit and demodulation code assigned to a CDMA receiving apparatus on a symbol unit basis at said time of said respective demodulation paths which are selected by said path search step and for estimating an adjustment angle for aligning phases of said respective demodulation paths from a result of demodulation of said pilot symbols;
a channel demodulating step which determines correlations between said received signal wave-form data recorded on said receiving signal wave-form buffer unit and said demodulation code at said time of said respective selected demodulation paths, as demodulation symbols on a symbol unit basis and for adjusting the phases of the symbols which are determined for each demodulation path based upon said adjustment angle of said each demodulation path which is estimated by said channel estimating step;
a RAKE step which combines said demodulation symbols of said respective demodulation paths, the phases of which are aligned to obtain combined demodulation symbols for outputting them; and
a reception quality measuring step for measuring the reception quality by comparing said combined demodulation symbols related with said pilot symbols of said combined demodulation symbols with a predetermined pilot pattern, and in that said demodulation paths which are selected in said path search step are changed depending upon whether or not said reception quality measured by said reception quality measuring step is lower than a predetermined preset reference value.

15. A CDMA receiving method as defined in claim 14, wherein
if said reception quality which is measured by said reception quality measuring step is lower than said preset reference value, a different combination of paths having a number not more than predetermined maximum number of paths is reselected by said path search step as said demodulation paths to be applied to demodulation and
in that said steps of
estimating said adjustment angle of each path by said channel estimating step,
channel modulating by said channel demodulating step,
combining of said demodulation symbols by said RAKE step and
measuring of said reception quality by said reception quality measuring step
are repeated again by using said same received signal wave-form data recorded on said received signal wave-form buffer unit.

16. A CDMA receiving method as defined in claim 14, wherein
if said reception quality which is measured by said reception quality measuring step is lower than said preset reference value, a different combination of a predetermined number of paths is reselected as said demodulation paths to be applied to demodulation from said path candidates and
in that said steps of
estimating said adjustment angle of each path by said channel estimating step,
channel modulating by said channel demodulating step,
combining of said demodulation symbols by said RAKE step and
measuring of said reception quality by said reception quality measuring step are repeated again by using said same received signal wave-form data recorded on said received signal wave-form buffer unit, and if said reception quality measured by said reception quality measuring step is lower than said preset reference value for all combinations of said repeated demodulation paths to be applied to demodulation by said path search step, a combination of said demodulation paths having best reception quality is selected from combinations of said demodulation paths having a reception quality which is not lower than a second reference value which is preset lower than said preset reference value so that said combined modulation symbol which is combined by said RAKE step is output.

17. A CDMA receiving method as defined in claim 14, wherein if said reception quality measured by said reception quality measuring step is lower than said preset reference value or is lower than a second reference value which is preset as a value lower than said preset reference value, said constraint length in said delay profile is set longer by a predetermined length, and in that said steps of selecting said demodulation paths by said path search step, estimating said adjustment angle of each path by said channel estimating step, channel modulating by said channel demodulating step, combining of said demodulation symbols by said RAKE step and measuring of said reception quality by said reception quality measuring step are repeated again by using said same received signal wave-form data recorded on said received signal wave-form buffer unit.

18. A CDMA receiving method as defined in claim 14, wherein if said reception quality measured by said reception quality measuring step is not lower than said preset reference value, said constraint length in said delay profile which is applied to subsequent received signals is set shorter by a predetermined value.

19. A CDMA receiving method as defined in any one of claims 14 to 18, wherein said received signal wave-form buffer unit comprises a plurality of recording areas which are different for each of said processing unit lengths, for recording said received signal wave-form data and in that said received signal wave-form data on the signals which are received by said radio unit until output processing of said combined demodulation symbols by said RAKE step using said received signal wave-form data recorded on any of said recording areas is completed is recorded on a recording area which is different from said recording area and in that when said output processing of said combined demodulation symbols using said received signal wave-form data recorded on said different recording area is completed, said different recording area is immediately cleared for recording.

20. A CDMA receiving method as defined in any of claims 14 to 18, wherein said receiving apparatus further include a wake-up counter unit which counts a predetermined wake-up timing which is substantially synchronized with the transmission time of stand-by information transmitted from a broadcasting station on a stand-by channel, in that when said wake-up counter counts out said wake-up timing, the power to said radio unit and said received signal wave-form buffer unit is turned on for receiving and recording said stand-by information on said stand-by channel and the power to said radio unit is turned on at the timing when a period of time elapses which is long enough to receive said stand-by information by said radio unit and to record said received signal wave-form data of said received stand-by information on said received signal wave-form buffer unit.

21. A CDMA receiving method as defined in claim 20, wherein the power to units for implementing said delay profile generating step, said path search step, said channel estimating step, said channel demodulating step, said RAKE step and said reception quality measuring step is turned on at a time to conduct a demodulation operation related with said received stand-by information when a period of time enough to record on said received signal wave-form buffer unit elapses and the power to said all units other than said wake-up counter unit is turned off at a time when the demodulation operation related with said stand-by information is completed.

22. A CDMA receiving method as defined in claim 20, wherein the power to units for implementing said delay profile generating step, said path search step, said channel estimating step, said channel demodulating step, said RAKE step and said reception quality measuring step is turned on at a time to conduct a demodulation operation related with said received stand-by information when a period of time enough to record on said received signal wave-form buffer unit elapses and the power to said all units other than said wake-up counter unit is turned off at a time when the demodulation operation related with said stand-by information is completed, and the power to all units other than said wake-up counter unit is turned off when a channel detection operation related to peripheral cells is completed in lieu of the time when the demodulation operation related with said stand-by information is completed if the channel detecting operation related with the peripheral cells is required in association with the demodulation operation related with said stand-by information is completed if the channel detecting operation related with the peripheral cells is required in association with the demodulation operation related with said stand-by information.

23. A CDMA receiving method as defined in claim 20, wherein the power to said radio unit is turned off at time when the period of time enough to record said received signal wave-form data related with said stand-by information on said received signal wave-form buffer unit plus the period of time to record on said received signal wave-form buffer unit, the received signal wave-form data required for channel detection related with peripheral cells which may be executed in association with said stand-by information elapses.

24. A CDMA receiving method as defined in claim 20, wherein if said reception quality related with said stand-by information measured by said reception quality measuring step is lower than said preset reference value or is lower than a second reference value which is preset as a value lower than said preset reference value, said constraint length in said delay profile is set longer by a predetermined length, and in that said steps of estimating said adjustment angle of each path by said channel estimating step, channel modulating by said channel demodulating step, combining of said demodulation symbols by said RAKE step and measuring of said reception quality by said reception quality measuring step are repeated again by using said same received signal wave-form data related with said stand-by information recorded on said received signal wave-form buffer unit.

25. A CDMA receiving method as defined in claim 20, wherein if said reception quality related with said stand-by information is not lower than said preset reference value, said constraint length in said delay profile which is applied to subsequent stand-by information is set shorter by a predetermined value.

26. A computer readable recording medium storing a CDMA receiving program, which when executed by a computer implements a CDMA receiving method as defined in any of claims 14 to 18, wherein any one or more of said delay profile generating step, said path search step, said channel estimating step, said channel demodulating step, said RAKE step and said reception quality measuring step are implemented by a program.

* * * * *